(12) United States Patent
Uno et al.

(10) Patent No.: US 7,331,609 B2
(45) Date of Patent: Feb. 19, 2008

(54) ADJUSTMENT STRUCTURE OF SEAT BELT DEVICE IN VEHICLE

(75) Inventors: Koji Uno, Wako (JP); Koji Ikeda, Wako (JP); Hideki Kajiwara, Wako (JP); Mitsuhiro Nishizaka, Wako (JP); Nobumoto Sekiguchi, Haga-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 397 days.

(21) Appl. No.: 10/886,776

(22) Filed: Jul. 8, 2004

(65) Prior Publication Data

US 2005/0253366 A1 Nov. 17, 2005

(30) Foreign Application Priority Data

May 12, 2004 (JP) ............... 2004-142384

(51) Int. Cl.
*B60R 22/24* (2006.01)
*B60R 21/18* (2006.01)

(52) U.S. Cl. ................... 280/801.2; 280/733

(58) Field of Classification Search ............ 280/801.1, 280/801.2, 733
See application file for complete search history.

(56) References Cited

U.S. PATENT DOCUMENTS 5,791,716 A * 8/1998 Takagi et al. .............. 296/39.1
6,361,069 B1 * 3/2002 Saito et al. ............... 280/730.2
6,435,602 B1 * 8/2002 Sukegawa et al. .......... 296/191
6,935,701 B1 * 8/2005 Arnold et al. ............. 297/473
7,198,300 B2 * 4/2007 Daume et al. ........... 280/801.2
2003/0094828 A1 * 5/2003 Nagamoto ................. 296/39.1
2006/0091666 A1 * 5/2006 Arnold et al. ........... 280/801.2
2007/0029773 A1 * 2/2007 Koning et al. ........... 280/801.2

FOREIGN PATENT DOCUMENTS

JP 3460636 8/2003

* cited by examiner

*Primary Examiner*—Paul N. Dickson
*Assistant Examiner*—Barry Gooden, Jr.
(74) *Attorney, Agent, or Firm*—Rankin, Hill, Porter & Clark LLP

(57) ABSTRACT

A lock releasing button is provided at a slide plate including a slip joint for slidably supporting a webbing for restraining an occupant to a seat. Locking of the slide plate to a center pillar is arranged to be released when the lock releasing button is pressed upward from below. Therefore, when an airbag presses to open a connecting portion between a roof lining and a pillar garnish and deploys downward at a time of collision of a vehicle, the lock releasing button is prevented from releasing the locking by being pressed by the airbag deploying downward. This prevents the situation in which the slip joint is moved downward together with the slide plate to loosen the webbing and thus a seat belt device cannot sufficiently exhibit an occupant restraining performance.

5 Claims, 11 Drawing Sheets

ADJUSTMENT STRUCTURE OF SEAT BELT DEVICE IN VEHICLE

BACKGROUND OF THE INVENTION

1. Field of the Invention

The present invention relates to a structure for adjusting a vertical position of a slip joint in a vehicle including an airbag device for deploying an airbag downward along an inner surface of a side portion of a vehicle compartment from a side edge of a roof, and a seat belt device in which a middle portion of a webbing is slidably guided by a slip joint provided at a pillar.

2. Description of the Related Art

Japanese Patent No. 3460636 discloses a seat belt device wherein a slide plate 52, to which a slip joint 51 for slidably guiding a webbing for restraining an occupant to a seat is fixed via an adjustable anchor 53, is supported along an inner surface of a center pillar garnish 22 to be movable up and down; projecting portions 22a and 52a triangular in section are formed at the center pillar garnish 22 or the slide plate 52 above the slip joint 51; and an airbag 31 which is deploying is guided with the projecting portions 22a and 52a so as to move the airbag 31 away from the center pillar 12 to prevent the airbag 31 deploying into a shape of a curtain along the inner surface of the vehicle compartment from the side edge of the roof from being caught by the slip joint 51 of the seat belt device and from becoming incapable of smoothly deploying.

Conventionally, when the position of the slip joint of the seat belt device is adjusted in the vertical direction in accordance with the physical constitution of an occupant, the slide plate is moved in the vertical direction along the center pillar in the state in which the locking of the slide plate to the center pillar is released by pressing downward the lock releasing button which is provided at the slide plate for supporting the slip joint, and the lock releasing button is released at a predetermined position to lock the slide plate to the center pillar.

However, in the above-described conventional structure, when the airbag deploying downward from the side edge of the roof at the time of collision of the vehicle interferes with the lock releasing button of the seat belt device, there is the possibility that the lock releasing button is pressed downward by the airbag to release the locking and the slide plate moves downward together with the slip joint to loosen the webbing, thereby deteriorating the occupant restraining performance.

SUMMARY OF THE INVENTION

The present invention is made in view of the above-described circumstances, and has an object to ensure an occupant restraining performance of a seat belt by preventing a lock releasing button of a slide plate of a seat belt device from being pressed by a deploying airbag.

In order to achieve the above-described object, according to a first feature of the present invention, there is provided an adjustment structure of a seat belt device in a vehicle including: an airbag device in which an airbag module accommodating an airbag in a folded state is placed along a side edge of a roof, and the airbag inflated at a time of collision of the vehicle presses to open a connecting portion between a roof lining covering the roof from a side of a vehicle compartment and a pillar garnish covering a pillar from the side of the vehicle compartment, and deploys downward into the vehicle compartment; and the seat belt device in which a middle portion of a webbing for restraining an occupant to a seat is slidably guided by a slip joint provided at a slide plate that is adjustable in its vertical position along the pillar garnish and that is capable of being locked to the pillar at a predetermined position, wherein a lock releasing button for releasing locking of the slide plate to the pillar is operated by being pushed upward from below.

According to the above-described construction, the lock releasing button is provided at the slide plate including the slip joint for slidably supporting the middle portion of the webbing for restraining the occupant to the seat, the locking of the slide plate to the pillar is released when the lock releasing button is pressed upward from below. Therefore, when the airbag which is inflated at the time of collision of the vehicle presses to open the connecting portion between the roof lining covering the roof from the side of the vehicle compartment and the pillar garnish covering the pillar from the side of the vehicle compartment, and deploys downward into the vehicle compartment, the lock releasing button is prevented from being pressed by the airbag which deploys downward along the pillar to release the locking. This prevents the situation in which the slip joint is moved downward together with the slide plate to loosen the webbing, and a seat belt device cannot sufficiently exhibit an occupant restraining performance.

According to a second feature of the present invention, in addition to the above-described first feature, the lock releasing button is biased downward by a tension spring.

According to the above-described construction, the lock releasing button is biased downward by the tension spring, and thereby the tension spring is stretched when the lock releasing button is pushed upward. Therefore, the tension spring is prevented from bending or inclining, and is allowed to exhibit a stable resilient force, thus improving operation feeling of the lock releasing button. If a compression spring is adopted in place of the tension spring, the compression spring is bent or falls when the lock releasing button is operated, and it becomes difficult to cause the compression spring to exhibit a stable resilient force. Thus, the operation feeling of the lock releasing button is deteriorated. If the compression spring is made thick to avoid this, the installment space for the spring is increased to make the layout difficult.

According to a third feature of the present invention, in addition to the above-described first feature, a linear rail extending in a vertical direction is projectingly provided at the slide plate, and the linear rail is in slidable contact with an arc surface projectingly provided at the pillar garnish.

According to the above-described construction, the linear rail extending in the vertical direction, which is projectingly provided at the slide plate, is in slidable contact with the arc surface projectingly provided at the pillar garnish. Therefore, the linear rail and the arc surface are brought into point contact and are made slidable with a small friction coefficient, thus facilitating the operation of adjusting the vertical position of the slide plate along the pillar garnish.

According to a fourth feature of the present invention, in addition to the above-described first feature, one spot of an upper portion of the pillar garnish is fixed to the pillar with a clip, and two spots at a front and rear of a lower portion of the pillar garnish are fixed to the pillar with locking claws.

According to the above-described construction, the one spot of the upper portion of the pillar garnish is fixed to the pillar with the clip, and the two pots at the front and rear of the lower portion of the pillar garnish are fixed to the pillar with the locking claws. Therefore, the pillar garnish can be positioned with respect to the pillar with a good accuracy, and the operation of locking the slide plate, which is slidably supported at the pillar garnish, to the pillar can be reliably performed.

According to a fifth feature of the present invention, in addition to the above-described first feature, a locking projection engageable with a locked portion formed at a vehicle body panel is provided at an upper end of the pillar garnish, and the locking projection is reinforced by ribs.

According to the above-described construction, the locking projection reinforced by the ribs is provided at the upper end of the pillar garnish, and the locking projection is engaged with the locked portion formed at the vehicle body panel. Therefore, the mounting rigidity can be enhanced without increasing the entire thickness of the upper end of the pillar garnish.

A center pillar 12 in the embodiment corresponds to the pillar of the present invention, an upper pillar garnish 36 in the embodiment corresponds to the pillar garnish of the present invention, a gusset 39 in the embodiment corresponds to a vehicle body panel of the present invention, and a tension coil spring 60 in the embodiment corresponds to the tension spring of the present invention.

The above-described object, other objects, features and advantages of the present invention will become apparent from the preferred embodiment described in detail below in conjunction with the accompanying drawings.

DESCRIPTION OF THE PREFERRED EMBODIMENT

An embodiment of the present invention will be described below based on the attached drawings.

Figure 1:
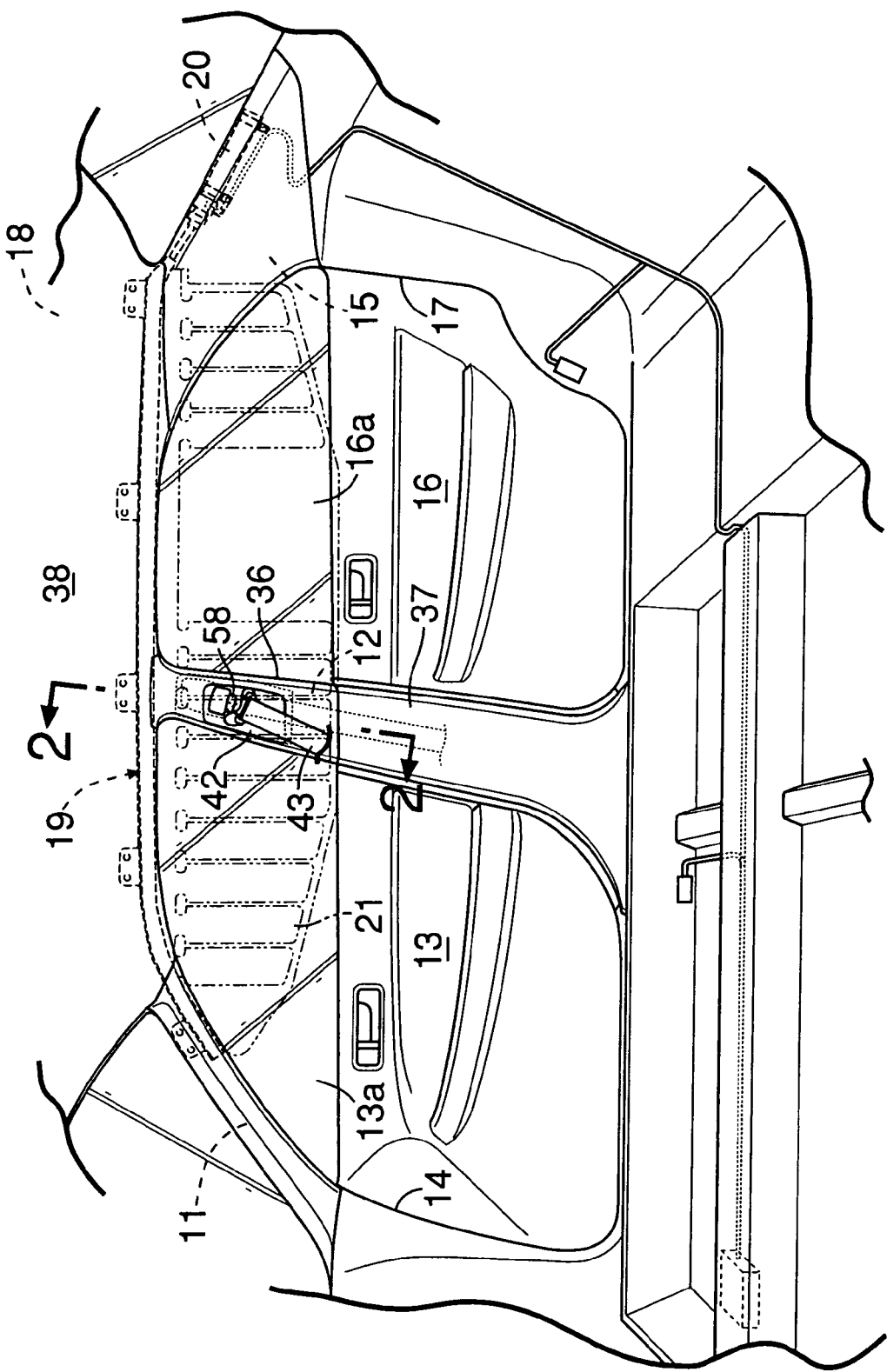
FIG. 1 is a view showing an inner surface of a vehicle compartment of an automobile including a seat belt device according to the present invention.

As shown in FIG. 1, on a side surface of a vehicle body of a vehicle, a door opening 14 in which a front door 13 is mounted is formed between a front pillar 11 and a center pillar 12, and a door opening 17 in which a rear door 16 is mounted is formed between the center pillar 12 and a rear pillar 15. An airbag module 19 is provided along a side edge of a roof 18 which extends from an upper end of the front pillar 11 to an upper end of the rear pillar 15. When acceleration of a predetermined value or higher is detected at a time of collision on the side surface of the vehicle or at a time of rolling over, an airbag 21 accommodated in the airbag module 19 is inflated by a high pressure gas which is supplied from an inflator 20 disposed inside the rear pillar 15, and deploys downward into a curtain shape from the side edge of the roof 18 so as to shield occupants seated on a front seat and a rear seat against an internal side surface of the vehicle body, that is, the front pillar 11, the center pillar 12, the rear pillar 15, a door glass 13a of the front door 13 and a door glass 16a of the rear door 16.

Figure 2:
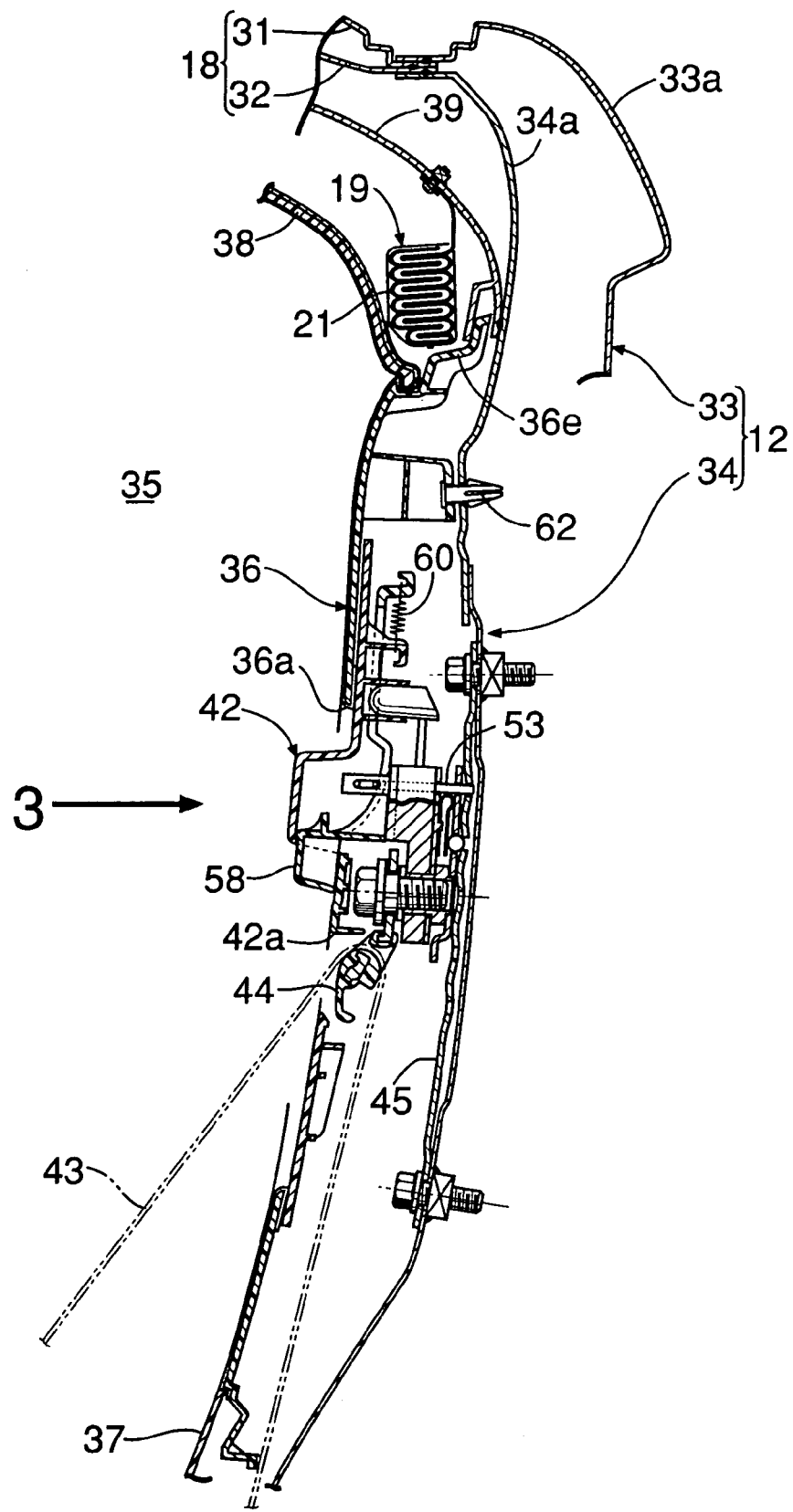
FIG. 2 is an enlarged sectional view taken along the line 2-2 in FIG. 1.
Figure 3:
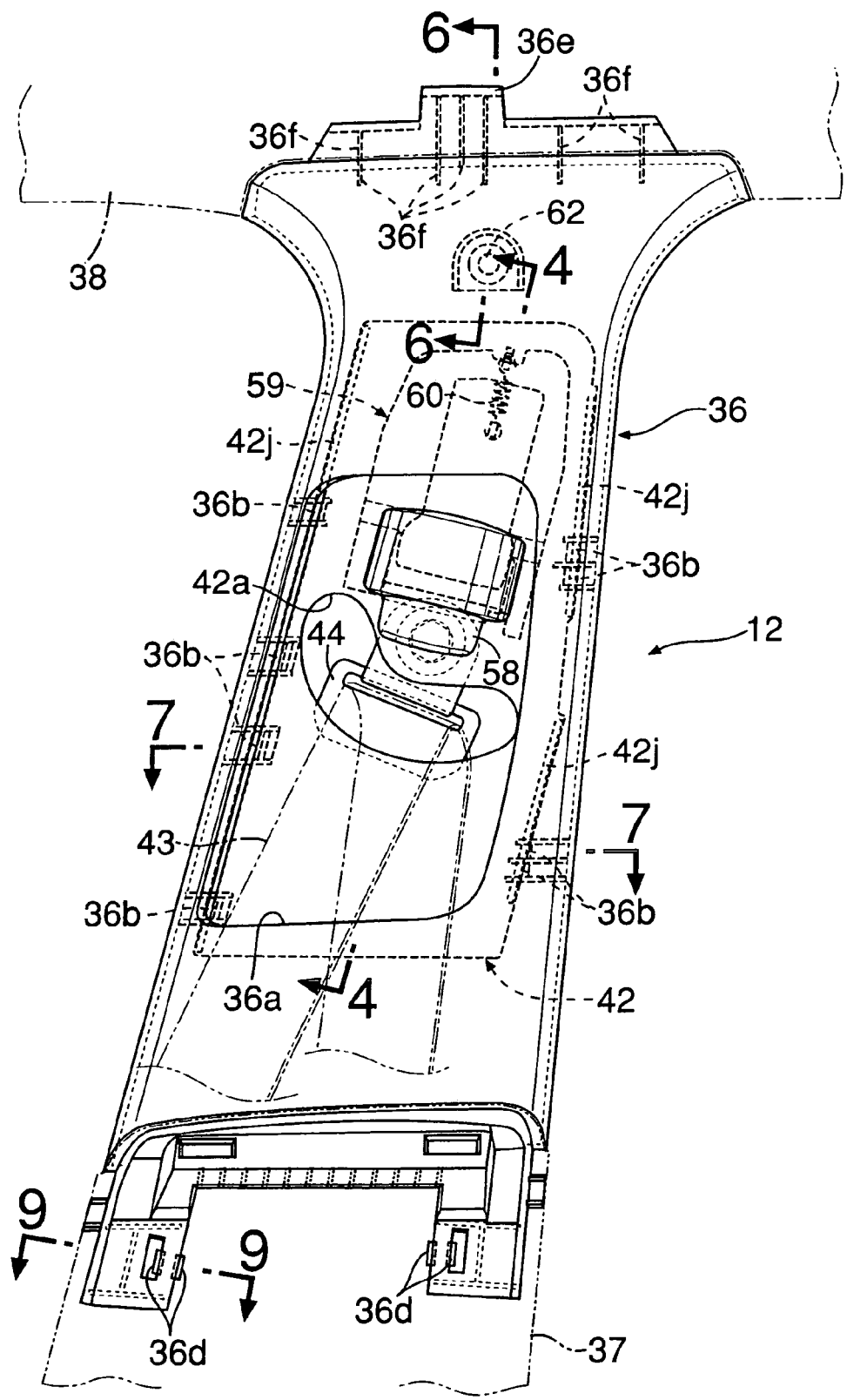
FIG. 3 is a view seen in the direction of the arrow 3 in FIG. 2.
Figure 4:
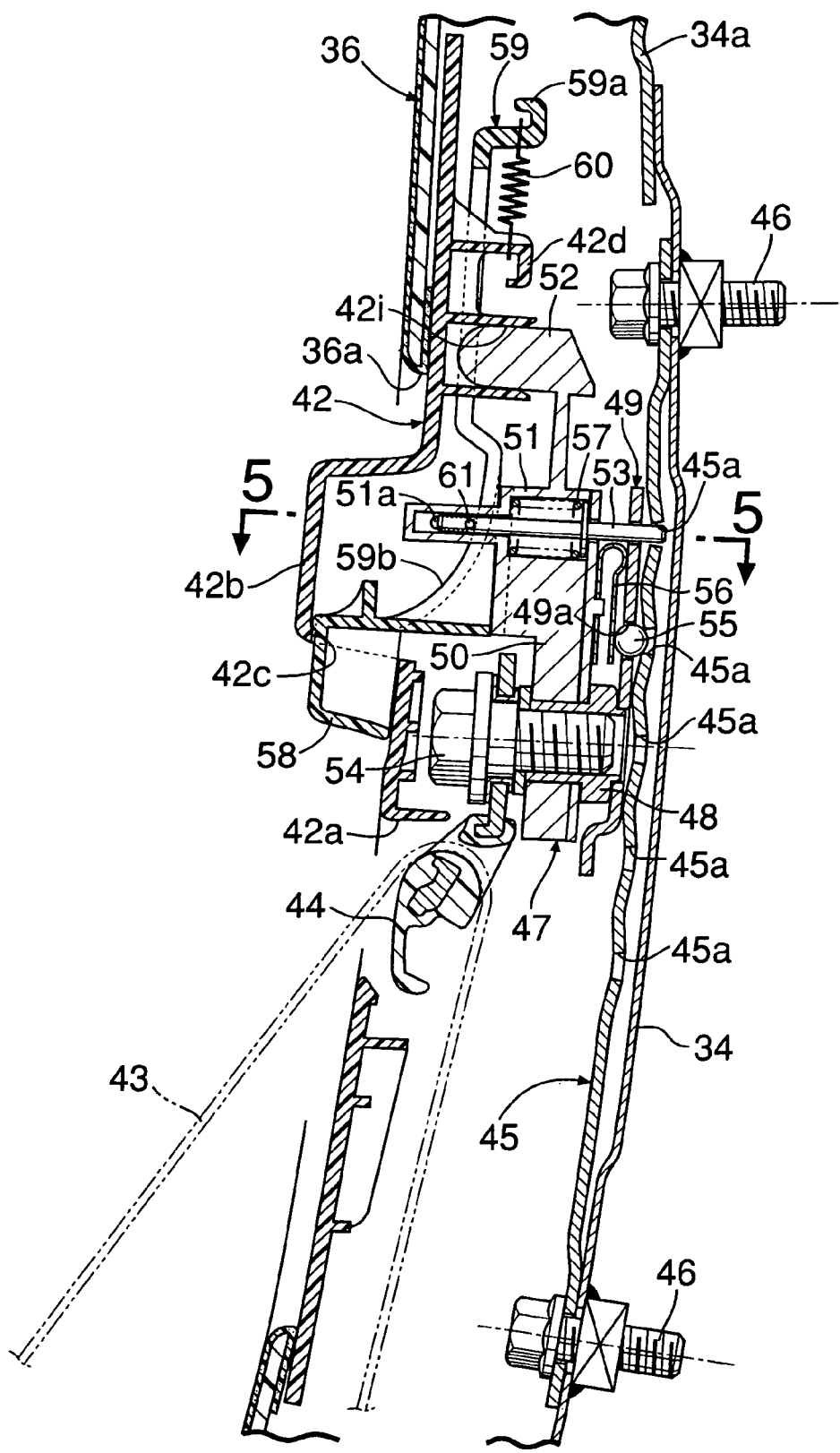
FIG. 4 is an enlarged sectional view taken along the line 4-4 in FIG. 3.
Figure 5:
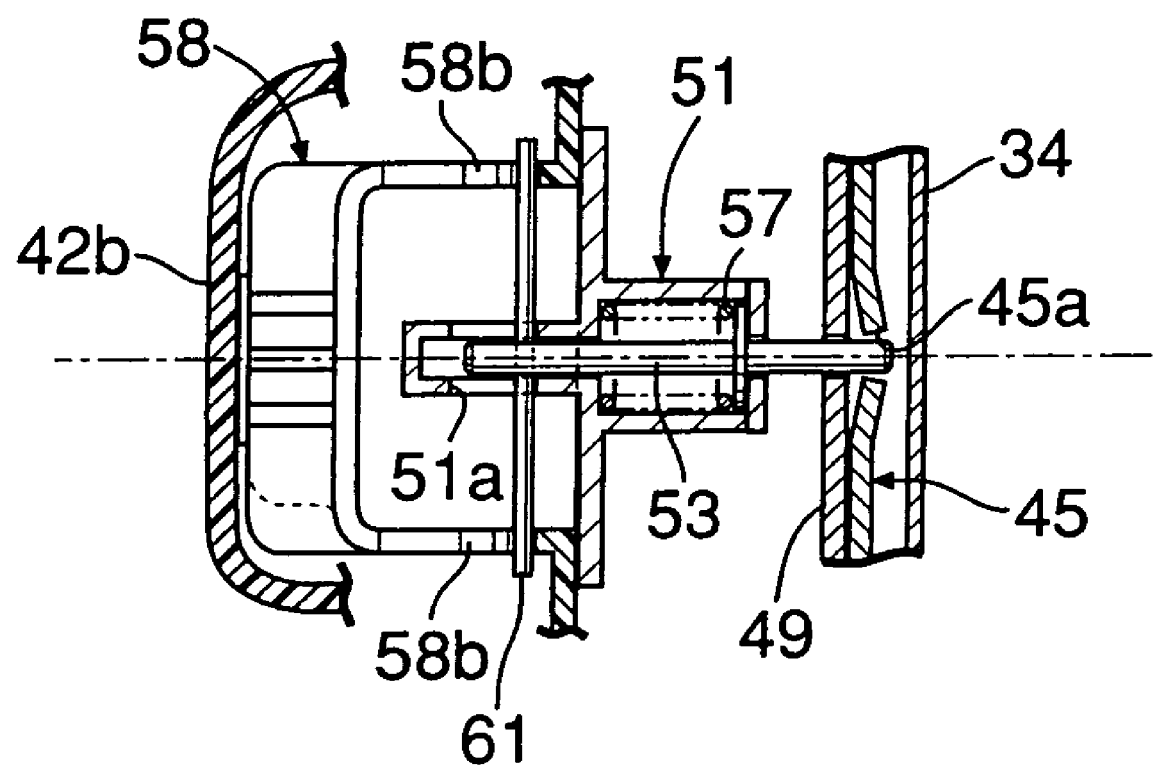
FIG. 5 is an enlarged sectional view taken along the line 5-5 in FIG. 4.
Figure 6:
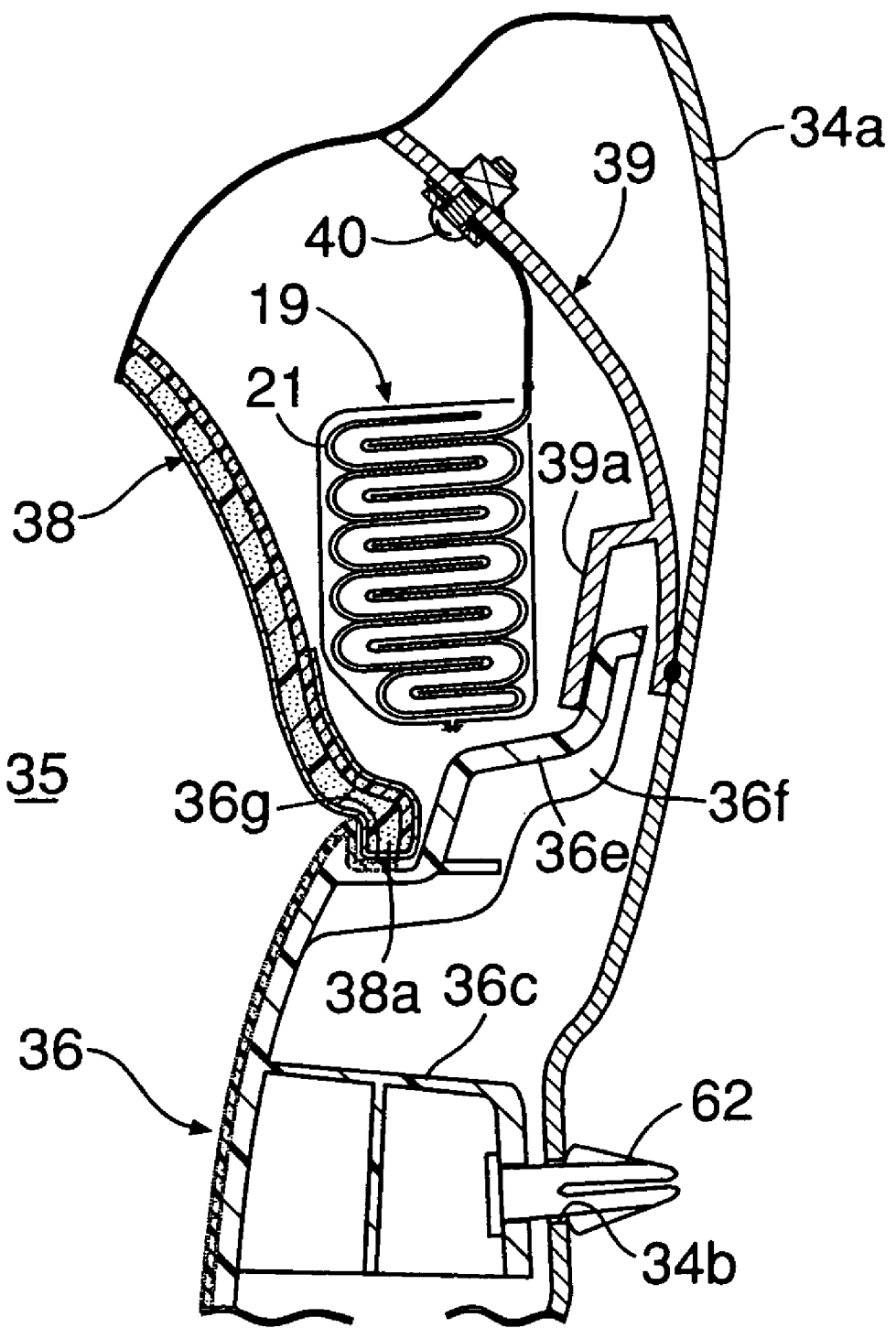
FIG. 6 is an enlarged sectional view taken along the line 6-6 in FIG. 3.
Figure 7:
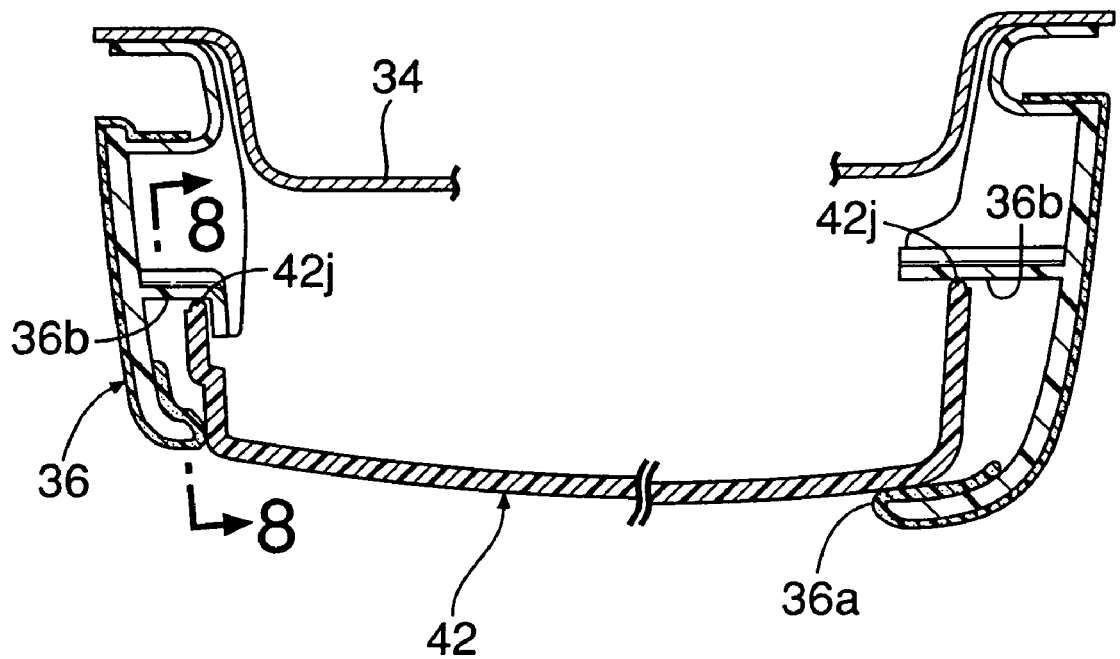
FIG. 7 is an enlarged sectional view taken along the line 7-7 in FIG. 3.
Figure 8:
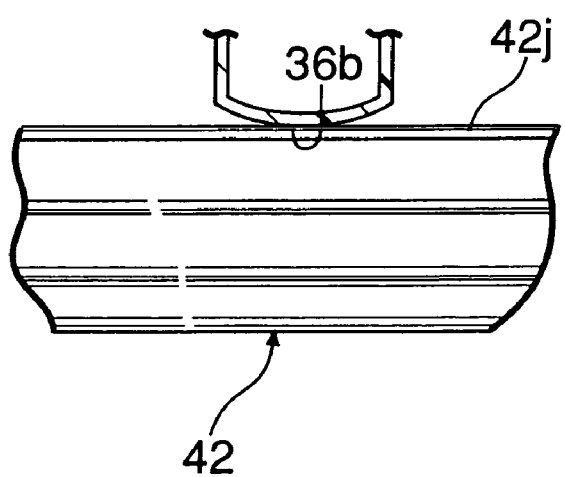
FIG. 8 is an enlarged sectional view taken along the line 8-8 in FIG. 7.
Figure 9:
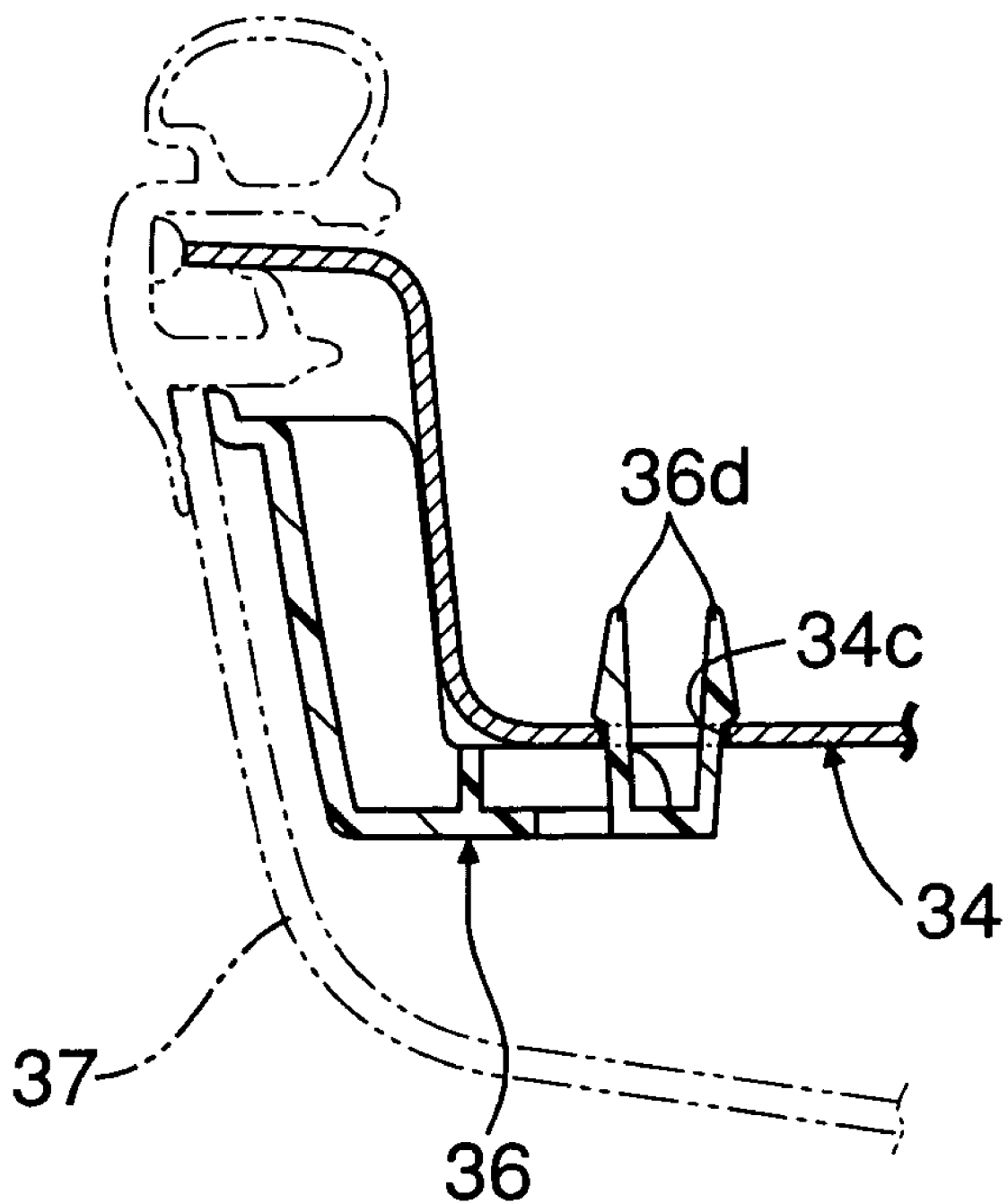
FIG. 9 is an enlarged sectional view taken along the line 9-9 in FIG. 6.

As shown in FIG. 1 and FIG. 2, the roof 18 is constructed by an outer roof 31 and an inner roof 32, and the center pillar 12 is constructed by an outer pillar 33 and an inner pillar 34. A curved gusset 39 is welded across the inner roof 32 and the inner pillar 34 so as to cover a welded portion where the outer and inner roofs 31 and 32 and the outer and inner pillar 33 and 34 are integrally welded along the side edge of the roof 18. A roof side rail portion 33a at an upper end of the outer pillar 33 and a roof side rail portion 34a at an upper end of the inner pillar 34 extend in a longitudinal direction of the vehicle body toward an upper portion of the front pillar 11 and the upper portion of the rear pillar 15, and below them, the outer pillar 33 and the inner pillar 34 extend in the vertical direction to be in the pillar shapes.

A surface of the inner roof 32 at a side of a vehicle compartment 35, and a surface of the roof side rail portion 34a of the inner pillar 34 at the side of the vehicle compartment 35 are covered with a roof lining 38 made of a synthetic resin. A surface of the inner pillar 34 at the side of the vehicle compartment 35 is covered with an upper pillar garnish 36 and a lower pillar garnish 37 which are made of a synthetic resin. The airbag module 19 which accommodates the folded airbag 21 is fixed to the gusset 39 with a bolt 40, and a rear end of the airbag 21 is connected to the inflator 20 inside the rear pillar 15.

Next, the structure of a seat belt device will be explained based on FIG. 3, FIG. 4 and FIG. 10 to FIG. 13.

The upper pillar garnish 36 is a member which is U-shaped in section, and a slide plate 42 is supported to be vertically slidable along an inner surface of the upper pillar garnish 36 (a surface at a side of the center pillar 12). A slip joint 44 through which a webbing 43 of the seat belt device slidably penetrates is disposed inside an arc-shaped opening 42a formed in the slide plate 42. The webbing 43 which diagonally runs on a chest portion of an occupant passes through the opening 42a of the slide plate 42 and the slip joint 44, and changes its direction downward to be wound up by an unillustrated retractor disposed at a lower end of the center pillar 12.

A lockplate 45, which has a plurality of (five in the embodiment) lock holes 45a . . . disposed at predetermined intervals in the vertical direction, is fixed to an outer surface of the inner pillar 34 (a surface at a side of the upper pillar garnish 36) with two upper and lower bolts 46 and 46. A slider 47 disposed to be vertically movable along the lock plate 45 includes a cylindrical nut member 48, a ball holder 49 fixed to the nut member 48, a slider body 50 fixed to the nut member 48, a lock pin guide portion 51 provided at an upper end of the slider body 50, a connecting projection 52 which projects upward from the lock pin guide portion 51, and a lock pin 53 slidably supported at the lock pin guide portion 51. The slip joint 44 which slidably guides the webbing 43 is fixed to the nut member 48 with a bolt 54.

A detent ball 55 supported at a supporting hole 49a formed in the ball holder 49 is biased toward the lock plate 45 by a plate spring 56. The detent ball 55 is fitted into any of the lock holes 45a, whereby the stop position of the slider 47 in the vertical direction is properly determined. The lock pin 53 which slidably penetrates through an upper portion of the ball holder 49 is biased in the direction to be engaged in the rock holes 45a . . . of the lock plate 45 by a compression coil spring 57.

The slide plate 42 slidably supported on an inner surface of an opening 36a formed at a central part of the upper pillar garnish 36 includes a projecting portion 42b which projects to the vehicle compartment 35 and a button supporting hole 42c which opens into an undersurface of the projecting portion 42b. A lock releasing button 58 is supported at the button supporting hole 42c to be vertically movable. An arm portion 59 in the shape of a rectangular frame is integrally connected to an upper portion of the lock releasing button 58, and a tension coil spring 60 is mounted between a spring seat 59a provided at an upper end of the arm portion 59 and a spring seat 42d which is projectingly provided on an inner surface (a surface at the side of the center pillar 12) of the slide plate 42. Accordingly, the lock releasing button 58 is biased downward by a resilient force of the tension coil spring 60, and is exposed from the button supporting hole 42c of the slide plate 42.

Figure 10:
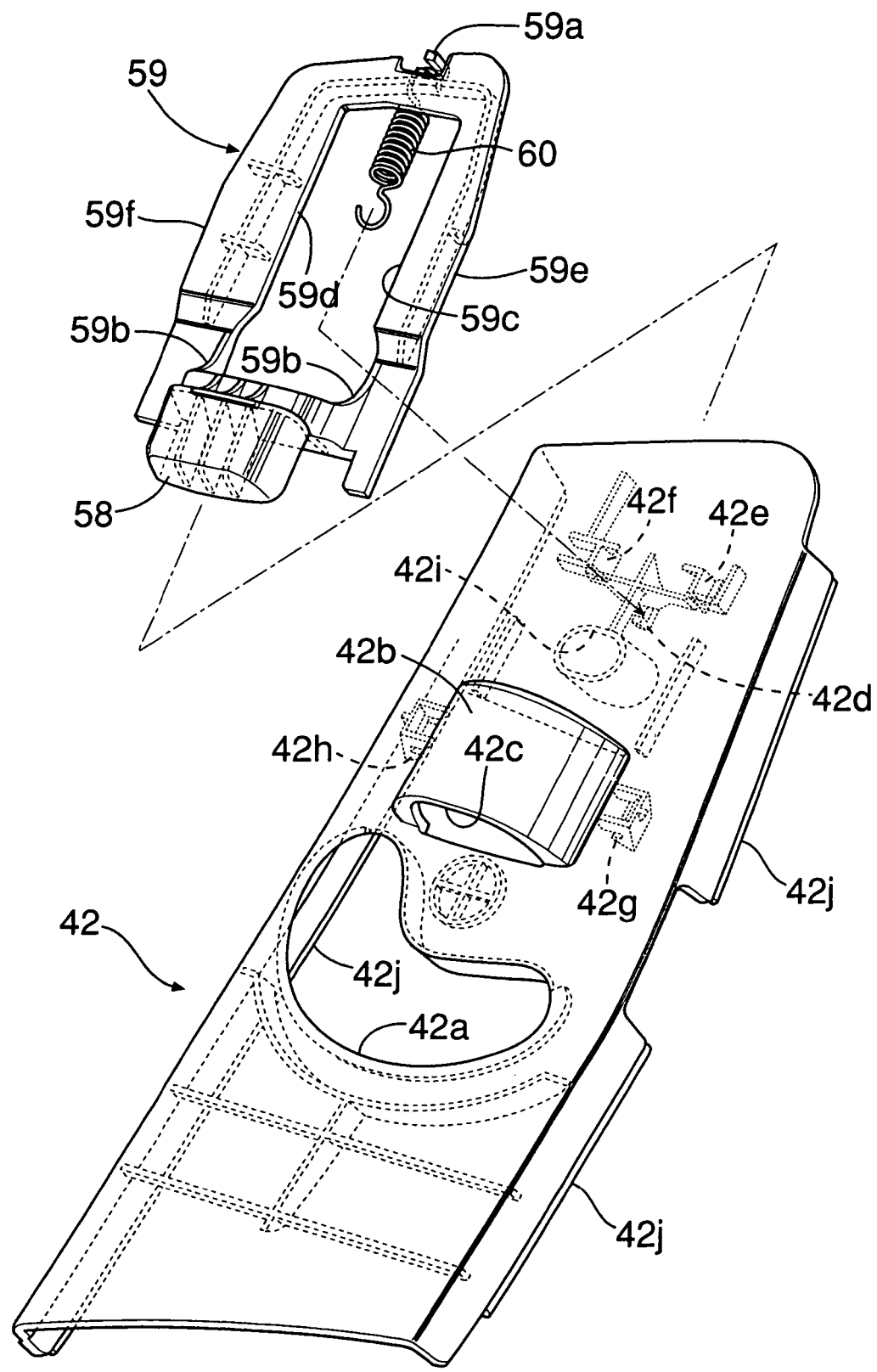
FIG. 10 is a perspective view of a lock releasing button, a leg portion and a slide plate.
Figure 11:
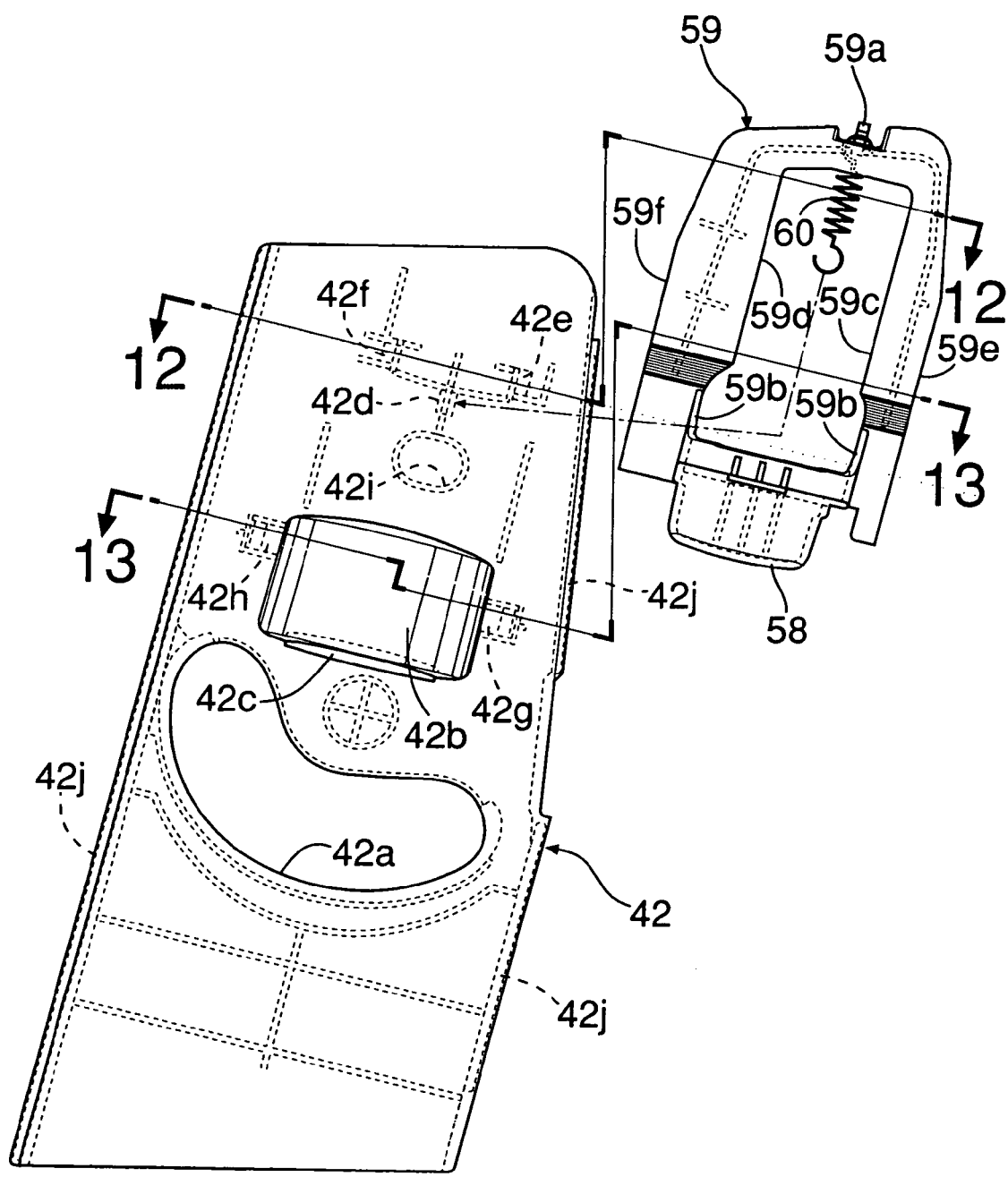
FIG. 11 is a front view of the lock releasing button, the leg portion and the slide plate.
Figure 12:
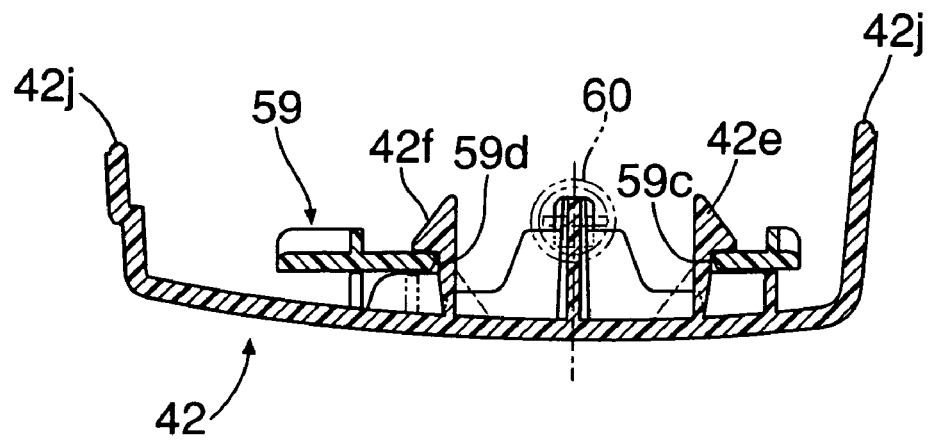
FIG. 12 is an enlarged sectional view taken along the line 12-12 in FIG. 11.
Figure 13:
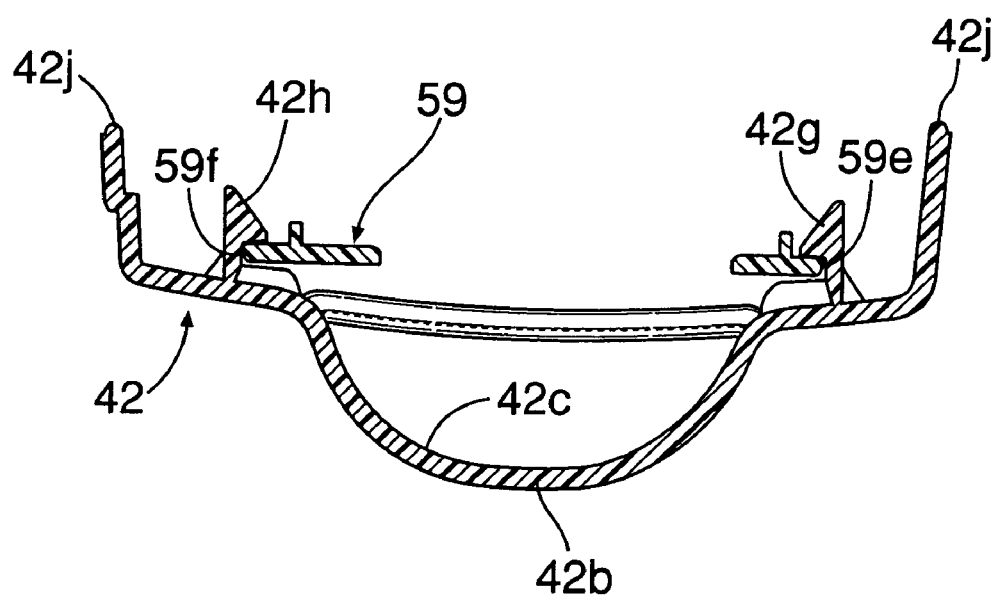
FIG. 13 is an enlarged sectional view taken along the line 13-13 in FIG. 11.

The frame-shaped arm portion 59 includes a pair of inner frames 59c and 59d extending in the vertical direction, and a pair of outer frames 59e and 59f extending in the vertical direction (see FIG. 10 and FIG. 11). The inner surface of the slide plate 42 is provided with a pair of upper guide projections 42e and 42f (see FIG. 12) which slidably guide a pair of inner frames 59c and 59d of the arm portion 59, and a pair of lower guide projections 42g and 42h (see FIG. 13) which slidably guide a pair of outer frames 59e and 59f of the arm portion 59. As a result, the arm portion 59 can vertically slide smoothly along the inner surface of the slide plate 42.

A pin-shaped cam follower 61 perpendicularly fixed to the lock pin 53 projects to the outside from a long hole 51a formed at the lock pin guide portion 51 in the axial direction, and cam surfaces 59b and 59b formed at the arm portion 59 abut to the cam follower 61. Accordingly, when the lock releasing button 58 is pressed upward from below, the lock pin 53 with the cam follower 61 being pressed by the cam surfaces 59b and 59b integrated with the lock releasing button 58 is pulled out of the lock hole 45a of the lock plate 45 against the resilient force of the compression coil spring 57.

The connecting projection 52 projecting upward from the lock pin guide portion 51 engages in a connecting hole 42i projectingly provided on the inner surface of the slid plate 42, thereby providing an integral connection between the slide plate 42 and the slider 47. Accordingly, when the slide plate 42 is moved up and down, the slider 47 follows the slide plate 42 to move up and down.

Next, based on FIG. 2, FIG. 3 and FIG. 6 to FIG. 10, the structure of the upper pillar garnish 36 will be explained.

Linear rails 42j . . . having rounded tip ends, are projectingly provided at both left and right side edges of the slide plate 42 having a generally U-shaped section. Arc surfaces 36b . . . (see FIG. 7) to which the linear rails 42j . . . slidably abut are projectingly provided on an inner surface of the upper pillar garnish 36. The axial lines of the linear rails 42j . . . and the axial lines of the arc surfaces 36b . . . are perpendicular to each other, and therefore, both of them can smoothly slide with very small sliding resistance in a point contact with each other, thus facilitating an operation of adjusting the vertical position of the slide plate 42 by the occupant.

The upper pillar garnish 36 is fixed to the inner pillar 34 at one spot in its upper portion and two front and rear spots in its lower portion. Namely, a clip 62 penetrating through a boss portion 36c projectingly provided on the upper inner surface of the upper pillar garnish 36 engages in a clip hole 34b formed in the inner pillar 34, and a pair of front and rear engaging claws 36d and 36d projectingly provided at a lower end of the upper pillar garnish 36 engages in engaging holes 34c and 34c formed in the inner pillar 34, whereby the upper pillar garnish 36 is fixed to the inner pillar 34 in a accurately positioned state.

The slide plate 42 is supported at the side of the upper pillar garnish 36, while the lock plate 45 and the slider 47 are supported at the side of the inner pillar 34. The upper pillar garnish 36 is positioned with respect to the inner pillar 34 with a good accuracy, whereby the relative position of the slide plate 42 with respect to the lock plate 45 and the slider 47 are controlled accurately, and the vertical movement of the slide plate 42 can be performed smoothly.

Further, a locking projection 36e bent upward after bent to the side of the inner pillar 34 is formed at the upper end of the upper pillar garnish 36, and aback surface of the locking projection 36e is reinforced by a plurality of ribs 36f . . . . A locked portion 39a is formed at the gusset 39 which connects the inner pillar 34 and the inner roof 32. The locked portion 39a is engaged with the locking projection 36e, whereby the upper end of the upper pillar garnish 36 is fixed to the garnish 39. At this time, an end edge 38a of the roof lining 38 engages in an engaging grove 36g (see FIG. 6) formed between the upper edge of the upper pillar garnish 36 and the locking projection 36e to be positioned.

When a synthetic resin component such as the upper pillar garnish 36 is molded, if the thickness is increased to enhance rigidity, the moldability is deteriorated, and therefore the maximum thickness is limited to about 3.5 mm. Thus, the locking projection 36e of the upper pillar garnish 36 is reinforced by a plurality of ribs 36f . . . , thereby enhancing the rigidity of the locking projection 36e to enhance mounting strength of the upper pillar garnish 36, while the thickness of each locking projections 36e is suppressed to 3.5 mm or less.

Next, the operation of the embodiment of the present invention having the above-described construction will be explained.

In order to adjust the height of the slip joint 44 of the seat belt device in accordance with the physical constitution of an occupant seated on the seat, the occupant pinches from above and below the upper surface of the projecting portion 42b of the slide plate 42 which is exposed from the opening 36a of the upper pillar garnish 36 and the undersurface of the lock releasing button 58, and presses the lock releasing button 58 upward from below against the resilient force of the tension coil spring 60. When the cam surfaces 59b and 59b provided at the arm portion 59 integral with the lock releasing button 58 move upward, the lock pin 53 with the cam follower 61 being guided by the cam surfaces 59b and 59b retreats while compressing the compression coil spring 57, and is released from the lock hole 45a of the lock plate 45, whereby locking of the slide plate 42 is released.

Accordingly, the occupant pinches the projecting portion 42b and the lock releasing button 58 and moves them up and down, and thereby the occupant can move the slide plate 42 up and down together with the slider 47. When the detent ball 55 provided at the slider 47 is fitted into a predetermined lock hole 45a and the slide plate 42 and the slider 47 are positioned, if the occupant releases his or her hold of the lock releasing button 58, the lock pin 53 moves forward by the resilient force of the compression coil spring 57 and engages in another lock hole 45a, whereby the slide plate 42 is locked at a predetermined height with respect to the center pillar 12, and the height of the slip joint 44 is adjusted in accordance with the physical constitution of the occupant.

In this manner, locking of the slide plate 42 is released by pushing the lock releasing button 58 upward from below, and therefore when the airbag 21, which is accommodated inside the airbag module 19 in the folded state, is inflated at the time of collision of the vehicle and deploys downward along the inner surface of the side portion of the vehicle compartment 35 from the opening which is made by pressing to open the end edge 38a of the roof lining 38, the lock releasing button 58 is reliably prevented from operating by being pressed by the airbag 21. This prevents the situation in which the locking of the slide plate 42 is released when the airbag 21 deploys, and then the position of the slip joint 44 descends together with the slide plate 42 to loosen the webbing 43; and ensures the occupant restraining force of the seat belt device.

In addition, the tension coil spring 60 is adopted as the means for biasing the lock releasing button 58 downward, and therefore the tension coil spring 60 is stretched when the lock releasing button 58 is pushed upward. As a result, the tension coil spring 60 is prevented from bending or inclining, and is allowed to exhibit a stable resilient force, thus improving operation feeling of the lock releasing button 58. If a compression coil spring is adopted in place of the tension coil spring 60, the compression coil spring is bent or falls when the lock releasing button 58 is pressed, and the compression coil spring is difficult to exhibit a stable resilient force. Thus, the operation feeling of the lock releasing button 58 is deteriorated. If the compression coil spring is made thick to avoid this, the installment space for the spring is increased to make the layout difficult.

The embodiment of the present invention is explained thus far, but various changes in design can be made without departing from the spirit of the present invention.

For example, the seat belt device for the seat in the front row has been explained in this embodiment, but the present invention can be also applicable to the seat belt devices for the seat in the rear row or the seat in the middle row.

What is claimed is:

1. An adjustment structure of a seat belt device in a vehicle including: an airbag device in which an airbag module accommodating an airbag in a folded state is placed along a side edge of a roof, and the airbag inflated at a time of collision of the vehicle presses to open a connecting portion between a roof lining covering the roof from a side of a vehicle compartment and a pillar garnish covering a pillar from the side of the vehicle compartment, and deploys downward into the vehicle compartment; and the seat belt device in which a middle portion of a webbing for restraining an occupant to a seat is slidably guided by a slip joint provided at a slide plate that is adjustable in its vertical position along the pillar garnish and that is capable of being locked to the pillar at a predetermined position, wherein a lock releasing button for releasing locking of the slide plate to the pillar is operated by being pushed upward from below, wherein the slip joint is disposed inside an opening formed in the slide plate, and wherein the slide plate further includes a projecting portion which projects to the vehicle compartment and a button supporting hole which opens into an undersurface of the projecting portion, and the lock releasing button is supported at the button supporting hole to be vertically movable.

2. The adjustment structure of the seat belt device in the vehicle according to claim 1, wherein the lock releasing button is biased downward by a tension spring.

3. The adjustment structure of the seat belt device in the vehicle according to claim 1, wherein a linear rail extending in a vertical direction is projectingly provided at the slide plate, and the linear rail is in slidable contact with an arc surface projectingly provided at the pillar garnish.

4. The adjustment structure of the seat belt device in the vehicle according to claim 1, wherein one spot of an upper portion of the pillar garnish is fixed to the pillar with a clip, and one spot of each of a front lower portion of the pillar garnish and a rear lower portion of the pillar garnish are fixed to the pillar with locking claws.

5. The adjustment structure of the seat belt device in the vehicle according to claim 1, wherein a locking projection engageable with a locked portion formed at a vehicle body panel is provided at an upper end of the pillar garnish, and the locking projection is reinforced by ribs.

* * * * *